US010193330B1

(12) United States Patent
Bartz et al.

(10) Patent No.: US 10,193,330 B1
(45) Date of Patent: Jan. 29, 2019

(54) SAFETY SYSTEM FOR MOTOR DRIVE

(71) Applicant: Rockwell Automation Technologies, Inc., Mayfield Heights, OH (US)

(72) Inventors: William A. Bartz, West Bend, WI (US); Michael W. Wielebski, Cedarburg, WI (US); Mark F. Pieronek, Sagamore Hills, OH (US); Joseph D. Riley, Grafton, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/828,873

(22) Filed: Dec. 1, 2017

(51) Int. Cl.
*H02H 7/12* (2006.01)
*H02H 7/085* (2006.01)
*H02M 3/335* (2006.01)

(52) U.S. Cl.
CPC ........ *H02H 7/1213* (2013.01); *H02H 7/0851* (2013.01); *H02M 3/33515* (2013.01)

(58) Field of Classification Search
CPC ............... H02H 5/042; H02H 7/1255; H02M 2001/325; H02M 3/155; H02M 7/5387
USPC ...... 361/18, 22, 79, 87, 92, 115; 363/50, 53, 363/56.01, 56.07
See application file for complete search history.

(56) References Cited

U.S. PATENT DOCUMENTS

| | | | | |
|---|---|---|---|---|
| 5,774,736 A * | 6/1998 | Wright | ................ | G06F 11/2015 713/321 |
| 6,046,896 A * | 4/2000 | Saeki | ................... | H02H 7/1213 323/284 |
| 6,362,980 B1 * | 3/2002 | Ohashi | ...................... | G06F 1/26 363/21.01 |
| 6,771,052 B2 * | 8/2004 | Ostojic | ..................... | H02J 1/08 323/266 |
| 7,672,109 B2 * | 3/2010 | Nitsche | ................ | H01H 47/002 361/115 |
| 9,444,246 B2 * | 9/2016 | Nakamura | .............. | H02M 1/32 |
| 2005/0128667 A1 * | 6/2005 | Okada | ....................... | H02J 1/08 361/64 |
| 2011/0016362 A1 * | 1/2011 | Holzaepfel | ......... | H04L 43/0852 714/51 |
| 2014/0347767 A1 * | 11/2014 | Nakamura | .............. | H02M 1/32 361/18 |

OTHER PUBLICATIONS

Linear Technology, LTC1696, "Overvoltage Protection Controller", Linear Technology Corporation 2001, LT 1214 REVB, 14 pages.
Linear Technology, LTC4365, "UV, OV and Reverse Supply Protection Controller", Linear Technology Corporation 2010, LT 0910, 16 pages.
"Safety in control systems according to EN ISO 13849-1 Machine Safety—Jokab Safety products", 2TLC172003B02002ABB Jokab Safety 2011, 20 pages.

* cited by examiner

*Primary Examiner* — Rajnikant B Patel
(74) *Attorney, Agent, or Firm* — Fay Sharpe LLP

(57) ABSTRACT

Disclosed examples provide control boards with power systems that include a safety system with a protection circuit to selectively connect or disconnect first and second DC to DC converters to or from a DC input signal according to the DC input signal and a monitor signal, and a monitor circuit to provide the monitor signal according to the first and second DC to DC converter output signals.

20 Claims, 3 Drawing Sheets

US 10,193,330 B1

SAFETY SYSTEM FOR MOTOR DRIVE

TECHNICAL FIELD

The subject matter disclosed herein relates to power conversion systems, including motor drive control circuit power systems with overvoltage protection and monitoring circuitry.

BACKGROUND INFORMATION

Category 4 functional safety (CAT4) compliance involves the ability to continue operating after two different failures in the safety circuits. Safe torque off (STO) functions ensure that no torque is applied by a driven motor during safe shutoff of a motor drive. Protection against a power supply exceeding the maximum intended output voltage (overvoltage protection) is important for CAT4 functional safety in motor drives as the redundant safe shutoff circuit for the PWM driver circuitry could be lost during an overvoltage event. Overvoltage protection to cover two concurrent faults is complicated for high performance motor drive control boards having multiple power rails that power associated downstream devices while implementing STO or other safety functions. Implementing safety functions such as STO enable and VCC as single channel elements requires high diagnostic coverage. Dual channel architectures are problematic. TVS diodes, fuses and other discrete components can be used to create redundant clamping circuits for each protected supply rail to protect against the possibility of multiple failures, but these solutions are costly in terms of circuit board space in motor drives. For two fault tolerant overvoltage protection of three supply rails, such a solution involves two clamping circuits in series on the output of each voltage rail. As motor drive control board sizes are reduced, conventional clamping circuit solutions are undesirable or not feasible.

BRIEF DESCRIPTION

Disclosed examples include motor drive control boards and associated power systems with a safety system having a protection circuit to selectively connect or disconnect first and second DC to DC converters to or from a DC input signal according to the DC input signal and a monitor signal, as well as a monitor circuit that provides the monitor signal according to the first and second DC output signals. Certain examples provide a control circuit for a motor drive that includes an input to receive a DC input signal, a first DC to DC converter to convert the DC input signal to provide a first DC output signal, a second DC to DC converter to convert the DC input signal to provide a second DC output signal. The control circuit further includes a protection circuit with a switch configured connect or disconnect the input to or from the first and second DC to DC converters, and a protection control circuit with an output to provide the switch control signal according to the DC input signal and a monitor signal. The control circuit also includes a monitor circuit that provides the monitor signal according to the first and second DC output signals. In certain examples, the protection control circuit receives a first sense signal that represents a voltage of the DC input signal, and provides the switch control signal to connect the input to the DC to DC converters when the first sense signal is below a first predetermined threshold value and the monitor signal is in a first state.

The monitor circuit in certain examples receives a second sense signal that represents a voltage of the first DC output signal, along with a third sense signal that represents a voltage of the second DC output signal, and provides the monitor signal in the first state when the second sense signal is below a second predetermined threshold and the third sense signal is below a third predetermined threshold. In certain examples, the output circuit provides the monitor signal in the second state when the second sense signal is greater than or equal to the second predetermined threshold or the third sense signal is greater than or equal to the third predetermined threshold, and the protection control circuit provides the switch control signal to disconnect the input from the first and second DC to DC converters when the first sense signal is greater than or equal to the first predetermined threshold value or the monitor signal is in the second state.

Certain disclosed examples provide ISO 13849-1 Category 4 (CAT 4) compliant power systems for a motor drive control board and safety systems thereof. The power system includes a power source to provide a DC input signal, along with first and second DC to DC converters, a protection circuit, and a monitor circuit. The protection circuit connects the DC input signal to the DC to DC converters in a first state when the DC input signal is below a first predetermined threshold and a monitor signal is in a first state, and disconnects the DC input signal from the DC to DC converters in a second state when the DC input signal is greater than or equal to the first predetermined threshold or the monitor signal is in a second state. The monitor circuit includes an output to provide the monitor signal in the first state when the output of the first DC to DC converter is below a second predetermined threshold and the output of the second DC to DC converter is below a third predetermined threshold, and the monitor circuit provides the monitor signal in the second state when the first DC output signal is greater than or equal to the second predetermined threshold or the second DC output signal is greater than or equal to the third predetermined threshold. In certain examples, the protection circuit includes a switch between the DC input signal and the DC to DC converters, as well as a protection control circuit that provides a switch control signal according to the DC input signal and the monitor signal.

DETAILED DESCRIPTION

Figure 1:
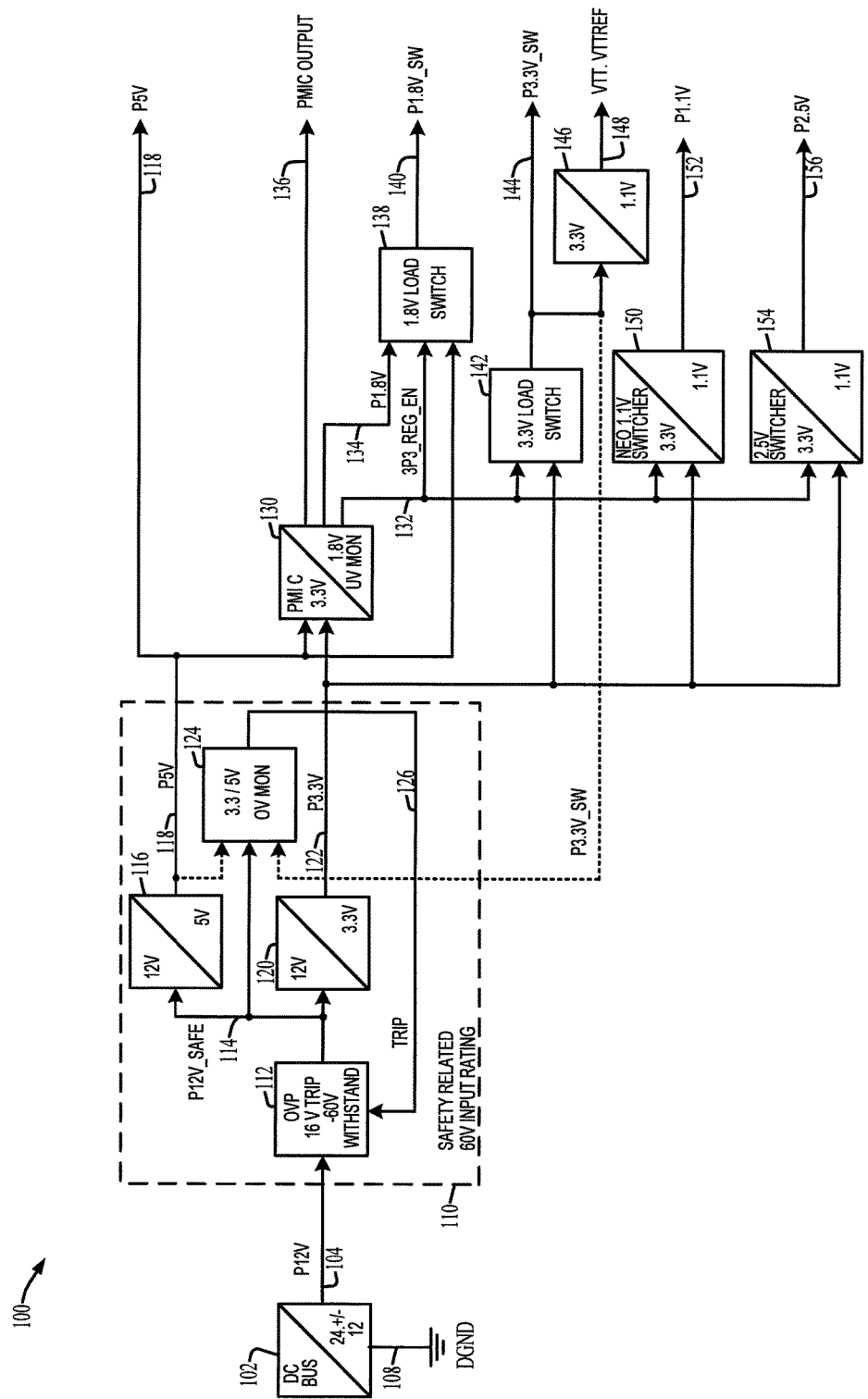
FIG. 1 is a schematic diagram of a motor drive control circuit power system with overvoltage protection and monitoring circuitry.

Referring now to the drawings, disclosed examples provide compact solutions for protecting against multiple faults. In certain examples, disclosed safety circuits include a single FET or other switch controlled by an overvoltage monitoring IC for an input supply signal, such as a 12 VDC rail, and the switch is controlled via another IC downstream that is monitoring the outputs of two or more DC to DC converters (e.g., a 3.3 VDC rail and a 5 VDC rail). The example 12 VDC supply can reach 60V after the accumulation of multiple faults. If an overvoltage event is detected on any of the three power rails, the main 12 VDC supply is disconnected to eliminate the threat of failure in safety circuits. In certain motor drive control board example implementations, 60 V tolerant supplies are used in combination with appropriate shutdown threshold values alone or in further combination with blocking diodes and series resistors on the inputs to the PWM drivers to provide a compact solution that is two fault tolerant. In one example, 60 V is the maximum voltage for two faults in the system 102, but other implementations can accommodate other specified two fault voltage levels, and the concepts of the present disclosure are not limited to the 60 V example.

FIG. 1 shows an example power system 100 for a motor drive control circuit 100, such as a main control board for an AC drive. The control board in one example includes various circuits and components, such as a processor, a memory, drive circuits to provide switching control signals for power conversion switches, etc. (not shown). The control circuit can include communications circuitry and digital and/or analog IO circuits (not shown) and other circuitry for speed, position and/or torque control of a driven motor load (not shown). Certain implementations of the described concepts facilitate protection for the components of the control circuit, including functional safety related devices and AC drive functional safety certification.

In the example of FIG. 1, a motor drive control board with a power system 100 includes a power source 102 to provide a nominal 12 VDC input signal P12V, along with a safety system 110 with an input 104 to receive the DC input signal P12V. The power source 102 provides the signal P12V as a supply voltage signal P12V_SAFE, at an output 114 with respect to a ground or common reference node 108 (DGND in the drawing). During normal operation in this example, the power source 102 provides a nominal 12 VDC voltage signal P12V. However, malfunction of the power source 102 may result in the voltage P12V of the node 104 exceeding 12 VDC, for example, as high as 60 VDC. The example safety circuit 110 includes a protection circuit 112 and first and second DC to DC converters 116 and 120, along with a monitor circuit 124. In the illustrated example, the safety circuit 110 includes components 112, 116, 120 and 124 that are designed to withstand supply voltages up to 60 VDC, although specific supply voltage withstanding performance is not a strict requirement of all possible implementations of the disclosed concepts. In the illustrated example, the power supply 102 provides a DC input signal that is limited to a predetermined maximum voltage after multiple faults.

In operation, the protection circuit 112 selectively connects or disconnects the DC to DC converters 116, 120 to or from the DC input 104 according to the voltage amplitude of the DC input signal P12V and according to a monitor signal TRIP. The monitor circuit 124 provides the monitor signal TRIP at a monitor circuit output 126 according to the first and second DC output signals P5V, P3.3V. In one example, the monitor circuit output 126 provides the monitor signal TRIP as a digital signal in a first state (HIGH) or a second state (LOW) according to the first and second DC output signals P5V and P3.3V.

The DC to DC converters 116 and 120 can be any suitable circuit that converts the DC input signal P12V to provide a DC output signal, such as buck converters in one example. The converters 116 and 120 can be regulated or unregulated. In the illustrated example, the first DC to DC converter provides a regulated nominal 5 VDC output voltage signal by converting a nominal 12 VDC DC input voltage signal. When powered by connection to the DC input signal P12V via the input 104 and the protection circuit 112, the first DC to DC converter 116 converts the DC input signal P12V and provides a first DC output signal P5V at an output 118. The second DC to DC converter 120 in this example converts the DC input signal P12V_SAFE and provides a regulated nominal 3.3 VDC output voltage signal P3.3V at an output 122.

The illustrated power system 100, moreover, also includes additional DC to DC converters 130, 142, 146, 150 and 154 as well as load switch is 138 and 142. The output 118 of the first DC to DC converter 116 is connected to deliver the first DC output signal P5V for use as a supply rail to the further DC to DC converter 130, and to a 1.8V load switch 138 as shown in FIG. 1. The output 122 of the second DC to DC converter 120 provides the second DC output signal P3.3V as an input to the further DC to DC converter 130 and as a supply rail to the further DC to DC converters 142, 150 and 154. The converter 130 also includes an output 132 that provides a 3.3 V regulator enable signal 3P3_REG_EN indicating that the converter 130 is operating properly. The converter 130 provides a regulated or unregulated 1.8 VDC signal P1.8V at an output 134. The converter 130 also provides an output signal PMIC OUTPUT (Power Management IC) at a signal output 136 for use by a power management circuit or other circuitry (not shown).

In the illustrated example, a 1.8V load switch 138 receives the 1.8 VDC signal P1.8V from the output 134, and receives the enable signal 3P3_REG_EN from the output 132. In addition, the load switch 138 receives the 5 VDC first DC output signal P5V from the first DC to DC converter 116. The load switch 138 includes an output 140 that provides a 1.8 VDC switch node signal P1.8V_SW, and the load switch 138 may include an internal inductor (not shown) connected between the 1.8 VDC output 134 of the converter 130 and the converter output 140. A 3.3V load switch 142 has inputs connected to the outputs 122 and 132 to receive the P3.3V and 3P3_REG_EN signal, respectively, as well as an output 144 that provides a 3.3 VDC switch node signal P3.3V_SW. The load switch 142 may include an internal inductor (not shown) connected between the 3.3 VDC output 122 of the converter 120 and the converter switch node output 144.

The further DC to DC converter 146 receives the 3.3 VDC switch node signal P3.3V_SW from the output 144 of the 3.3V load switch 142 and includes an output 148 that provides a 1.1 VDC reference voltage output signal VTT.VTTREF. Another DC to DC converter 150 has an input connected to receive the 3.3 VDC switch node signal P3.3V_SW from the output 122 of the converter 120, and an output 152 that provides a 1.1 VDC output signal P1.1V. The further DC to DC converter 154 has an input connected to receive the 3.3 VDC switch node signal P3.3V_SW from the output 122 of the converter 120, and an output 156 that provides a 2.5 VDC output signal P2.5V. In this example, the converters 130, 150 and 154 receive the 3.3 VDC voltage signal P3.3V and convert this to provide their corresponding output voltage signals P1.8V, P1.1V and P2.5V, respectively. In addition, the converter 130 provides the enable signal 3P3_REG_EN at the output 132 in a first state (e.g., HIGH) to enable the load switches 138 and 142 and the converters 150, 154, and in a second state (e.g., LOW) to disable the circuits 138, 142, 150 and 154. As seen in FIG. 1, moreover, the monitor circuit 124 includes an input connected to the output 118 of the DC to DC converter 116 and an input coupled through the load switch 142 to the output 122 of the second DC to DC converter 120 to monitor the first and second DC output signals P5V and P3.3V. The monitor circuit 124 generates the TRIP signal according to the DC output signals P5V and P3.3V and delivers the TRIP signal at the output 126 to the input of the protection circuit 112.

Figure 2:
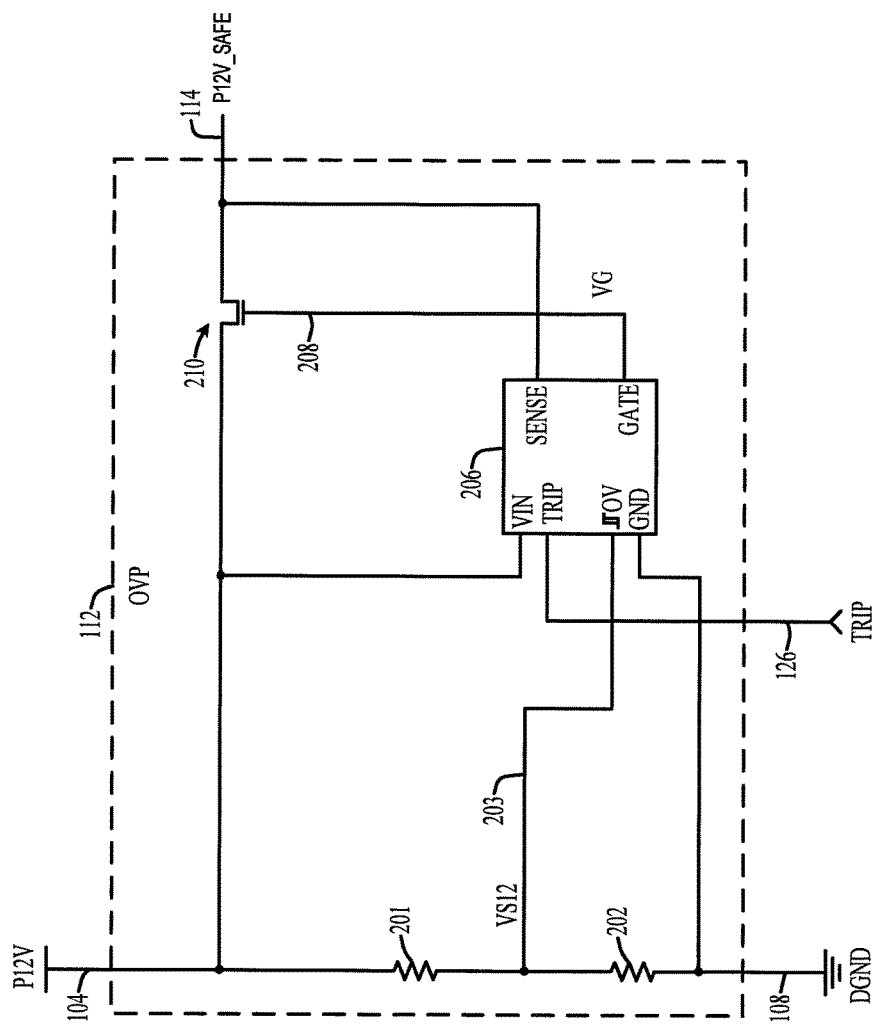
FIG. 2 is a schematic diagram of an example protection circuit in the system of FIG. 1.

FIG. 2 shows an example protection circuit 112 in the power system 100 of FIG. 1. The protection circuit 112 receives the P12V signal at the input 104 and receives the TRIP signal from the monitor circuit output 126. The protection circuit 112 includes a switch 210. Any suitable switch can be used, including without limitation, one or more transistors, relays, etc. In one example, the switch 210 includes an n-channel field effect transistor (NMOSFET) connected between the input 104 (P12V) and the protection circuit output 114 (P12V_SAFE), with a gate control terminal 208 connected to receive a switch control signal VG. In this example, the NMOSFET switch 210 operates when the switch control signal VG is in a first state (e.g., gate control voltage HIGH) to connect the input 104 to the first and second DC to DC converters 116, 120, and configured when the switch control signal VG is in a different second state (e.g., LOW) to disconnect the input 104 from the first and second DC to DC converters 116 and 120. In operation, the protection circuit 112 provides overvoltage protection (OVP) to protect downstream devices connected to the output 114 against overvoltage conditions at the input 104. The illustrated example includes downstream devices rated to withstand up to 60 VDC on the protection circuit output 114. In addition, the protection circuit 112 in one example is configured to selectively disconnect the output 114 from the input 104 when the voltage of the DC input signal P12V exceeds a predetermined threshold voltage (e.g., 20 VDC). Other suitable thresholds can be used in different implementations.

The protection circuit 112 includes a first resistive divider circuit including resisters 201 and 202 connected in series with one another between the input 104 and the ground or common reference node 108 (DGND). A connection node 203 that joins the resisters 201 and 202 provides a first sense signal VS12 that represents the voltage of the DC input signal P12V. The example protection circuit 112 also includes a first input connected to the voltage divider connection node 203 to receive the first sense signal VS12 that represents the voltage of the DC input signal P12V, and a second input coupled to receive the monitor signal TRIP from the monitor circuit output 126.

In one example, the protection control circuit 206 is a supply protection controller integrated circuit that includes a power input pin (VIN) connected to the input 104, an active low shut down or trip signal input pin (TRIP) connected to the monitor circuit output 126 to receive the TRIP signal, an overvoltage comparison signal input pin (OV) connected to the voltage divider connection node 203 to receive the first sense signal VS12, a ground or reference pin (GND) connected to the common reference node 108 (DGND), an output voltage sense input signal pin SENSE connected to the protection circuit output 114 to sense the voltage of the signal P12V_SAFE, and a gate control output pin connected to the protection control circuit output 208 to provide the switch control signal VG to the gate control terminal of the transistor switch 210.

In operation, the protection control circuit 206 provides the switch control signal VG at the output 208 in either the first or second state according to the DC input signal P12V and the monitor signal TRIP. In the illustrated example, the protection control circuit 206 is configured as shown in FIG. 2 to provide the switch control signal VG in the first state (e.g., HIGH) when the monitor signal TRIP is in the first state HIGH and the first sense signal VS12 is below a first predetermined threshold value. The protection control circuit 206 is configured to provide the switch control signal VG in the second state LOW when the first sense signal VS12 is greater than or equal to the first predetermined threshold value or the monitor signal TRIP is in the second state LOW. In the illustrated example, the protection control circuit 206 thus operates to disconnect the downstream devices by turning off the switch 210 when the TRIP signal indicates that one of the monitored downstream devices is undergoing an overvoltage condition or when the voltage of the DC input signal P12V exceeds the first predetermined threshold. Compared with conventional overvoltage protection solutions, the disclosed protection circuitry 110 advantageously provides a shared protection mechanism implemented in this case by the switch 210 in combination with distributed monitoring by way of the monitor circuit 124, while implementing two fault protection capabilities compliant with CAT4 specifications.

Figure 3:
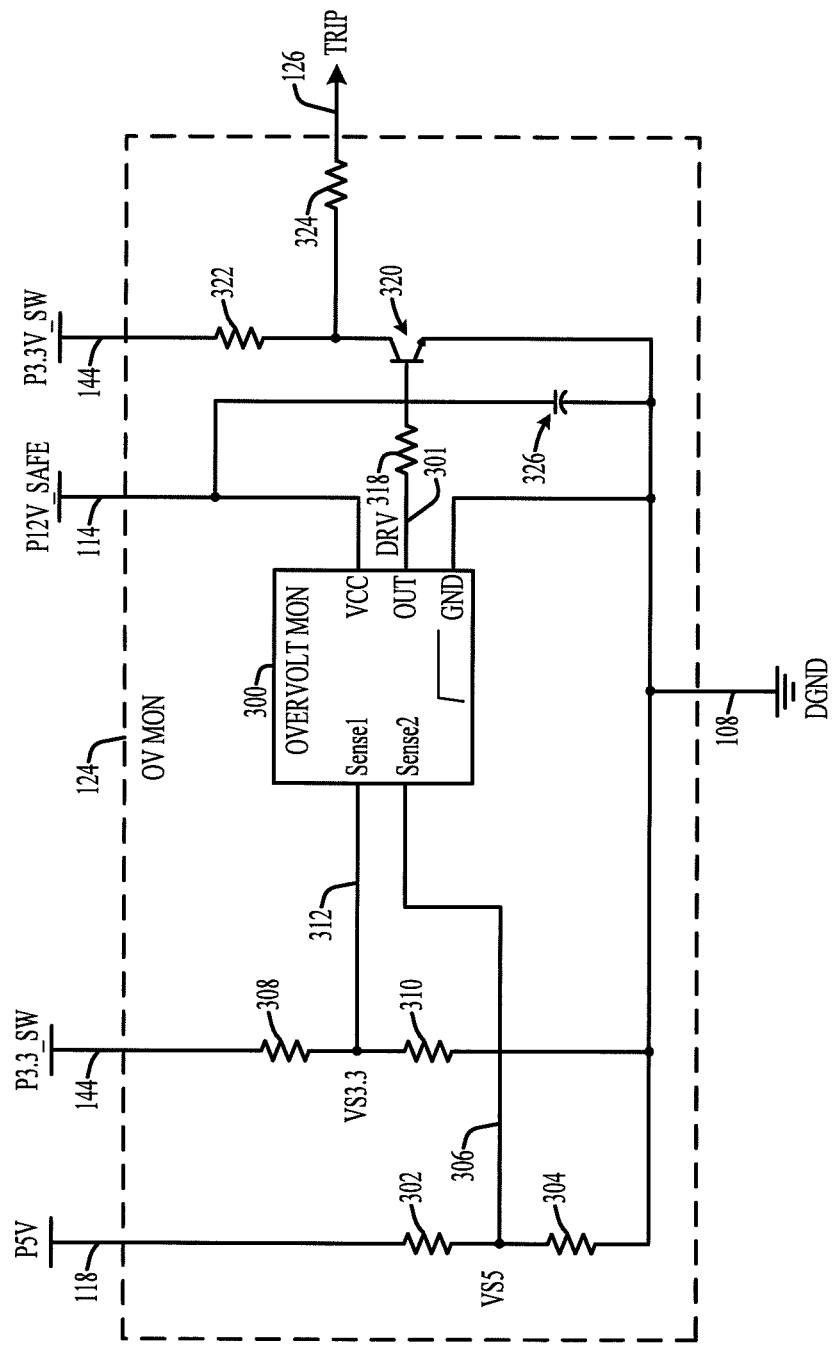
FIG. 3 is a schematic diagram of an example secondary supply overvoltage monitor circuit in the system of FIG. 1.

FIG. 3 shows an example secondary supply overvoltage monitor (OV MON) circuit 124 which can be used in certain implementations of the system 100 of FIG. 1. The monitor circuit 124 includes a comparison circuit 300 (labelled OVERVOLT MON) that implements various comparison functions used in monitoring the first and second DC output signals P5V and P3.3V, as well as driver circuitry that generates the monitor signal TRIP according to the monitored voltage comparisons. The comparison circuit 300 can include discrete comparator circuits in certain implementations. In one example, the monitor circuit 124 is an overvoltage protection controller integrated circuit to implement overvoltage monitoring with respect to the outputs of the first and second DC to DC converters 116 and 120. The illustrated comparison circuit 300 includes feedback input pins (labelled Sense1 and Sense2), power and ground pins (VCC and GND), and a driver output pin (OUT). A bypass capacitor 326 is connected between the supply connection at node 121 and the circuit ground reference node connection 108.

In certain examples, the protection control circuit 206 and the comparison circuit 300 are separate integrated circuits mounted to the drive control board along with the associated circuit components shown in FIGS. 2 and 3. In practice, this implementation advantageously reduces the amount of circuit board space consumed by two fault protection solutions compared with conventional approaches that use replicated monitoring and clamping circuits for each protected supply rail. Moreover, although illustrated and described in connection with a single external monitor circuit 124 that monitors two DC to DC converter output signals, further localized monitoring circuits 124 can be used to scale the two fault CAT4 protection to protect any number of two or more supply rails in a drive control board or other multi-rail power system.

In the example of FIG. 3, the monitor circuit 124 includes a first resistive divider circuit with resistors 302 and 304 coupled in series with one another between the output 118 of the first DC to DC converter 116 (P5V) and the reference node 108 (DGND). The first resistive divider circuit includes a connecting node 306 that provides a second sense signal VS5 that represents the voltage of the first DC output signal P5V to the second input Sense2. The monitor circuit 124 also includes a second resistive divider circuit formed by the series connection of resistors 308 and 310 between the output 122 of the second DC to DC converter 120 (e.g., in one example through the 3.3V load switch 142 in FIG. 1) and the reference node 108. The second resistive divider circuit 308, 310 includes a connecting node 312 that provides a third sense signal VS3.3 that represents the voltage of the second DC output signal P3.3V (e.g., P3.3V_SW at the output of the load switch 142) to the third input Sense1. In other examples, the resistive divider circuit 308, 310 is connected directly to the output 122 of the second DC to DC converter 120 to directly sense the second DC output signal P3.3V. In the illustrated example, the GND pin is connected to the reference node 108.

The example monitor circuit 124 in FIG. 3 also includes an output circuit formed by resistors 318 and 322 and a transistor 320. The output circuit operates according to a driver output signal DRV from the comparison circuit output 301 to provide the monitor signal TRIP in the first state (e.g., HIGH) when the second sense signal VS5 is below a second predetermined threshold and the third sense signal VS3.3 is below a third predetermined threshold. In addition, the output circuit 318, 320, 322 is configured to provide the monitor signal TRIP in the second state (LOW) when the second sense signal VS5 is greater than or equal to the second predetermined threshold or the third sense signal VS3.3 is greater than or equal to the third predetermined threshold. In one example, the second predetermined threshold represents a voltage approximately 10% above the nominal level of the 5 VDC first DC output signal P5V, and the third predetermined threshold represents a voltage approximately 10% above the nominal level of the 3.3 VDC second DC output signal P3.3V. Other thresholds can be used in different implementations to provide a suitable level of protection for connected downstream circuits. The driver transistor 320 in the illustrated example is an NPN bipolar transistor biased to the 3.3V switch voltage signal P3.3V_SW by the resistor 322 connected between the load switch output node 144 and the collector of the transistor 320. The transistor emitter is connected to the reference node 108. The collector provides the monitor signal TRIP to the protection circuit input 126 through an output resistor 324.

The transistor 320 is controlled by the driver output signal DRV to provide the monitor signal TRIP in the first state (HIGH) when the driver output signal DRV is in a first state (LOW), and to provide the monitor signal TRIP in the second state (LOW) when the driver output signal DRV is in the second state (HIGH). The comparison circuit 300 in this example compares the second sense signal VS5 to a reference signal that represents the second predetermined threshold, and compares the third sense signal VS3.3 to another reference signal that represents the third predetermined threshold. The comparison circuit 300 includes an output 301 that provides the driver output signal DRV in a first state (LOW) when the second sense signal VS5 is below the second predetermined threshold and the third sense signal VS3.3 is below the third predetermined threshold. The comparison circuit output 301 provides the driver output signal DRV in a different second state (HIGH) when the second sense signal VS5 is greater than or equal to the second predetermined threshold or the third sense signal VS3.3 is greater than or equal to the third predetermined threshold.

By this configuration, the example monitor circuit 124 provides the monitor signal TRIP in the first state (HIGH) when a second sense signal VS5 is below the second predetermined threshold and the third sense signal VS3.3 is below the third predetermined threshold, and provides the monitor signal TRIP in the second state (LOW) when the second sense signal VS5 is greater than or equal to the second predetermined threshold or the third sense signal VS3.3 is greater than or equal to the third predetermined threshold. As previously discussed, the protection circuit 112 monitors the active low TRIP signal from the monitor circuit output 126 and selectively operates the switch 210 (FIG. 2) to connect the DC input signal P12V to the DC to DC converters 116 and 120 when the DC input signal P12V is below the first predetermined threshold (e.g., P12V<20 VDC) and the monitor signal TRIP is in high, and disconnects the DC input signal P12V from the DC to DC converters 116 and 120 when the DC input signal P12V is greater than or equal to the first predetermined threshold or the monitor signal TRIP is brought low by the monitor circuit 300.

The disclosed examples support functional safety CAT4 certification and provide a compact solution that monitors three or more different supplies, allowing protection of all of the downstream supplies without occupying an excessive amount of circuit board space. One example implementation uses two integrated devices (ICs 206 and 300) and 2 transistors (210 and 320) in combination with 60V tolerant power supplies to provide protection and monitoring of the 3.3V, 5.0V and 12V rails in a small footprint. In one example, the protection circuitry occupies a total area of about 39 mm$^2$ for all components for both circuits, which represents a significant area reduction compared with an occupied area of about 95 mm$^2$ for solutions using redundant discrete clamping circuits to protect against the possibility of two simultaneous faults. Moreover, the distributed monitoring circuitry can be scaled to accommodate further monitoring at different locations in a given circuit board design, providing flexibility in the layout on where to place the circuits. The disclosed examples monitor multiple supplies allowing increased diagnostic coverage, and provide intelligent use of shared protection shutoff switching (e.g., switch 210 in FIG. 2) for a scalable solution, as more supplies can be monitored, feeding the shutdown (e.g., TRIP signal(s) back to the main power shutoff.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Also, the terms "couple", "couples", or "coupled" are intended to include indirect or direct electrical or mechanical connection or combinations thereof. For example, if a first device couples to or is coupled with a second device, that connection may be through a direct electrical connection, or through an indirect electrical connection via one or more intervening devices and connections.

The following is claimed:

1. A control circuit, comprising:
    an input to receive a DC input signal;
    a first DC to DC converter to convert the DC input signal to provide a first DC output signal;
    a second DC to DC converter to convert the DC input signal to provide a second DC output signal;
    a protection circuit, including:
        a switch configured when a switch control signal is in a first state to connect the input to the first and second DC to DC converters, and configured when the switch control signal is in a different second state to disconnect the input from the first and second DC to DC converters, and a protection control circuit, including a protection control circuit output to provide the switch control signal according to the DC input signal and a monitor signal; and a monitor circuit, including a monitor circuit output to provide the monitor signal in one of a first state and a second state according to the first and second DC output signals.

2. The control circuit of claim 1, wherein the protection control circuit includes a first input to receive a first sense signal that represents a voltage of the DC input signal, and a second input coupled to receive the monitor signal.

3. The control circuit of claim 2, wherein the protection control circuit is configured to provide the switch control signal in the first state when the first sense signal is below a first predetermined threshold value and the monitor signal is in the first state.

4. The control circuit of claim 3, wherein the monitor circuit includes:

a second input to receive a second sense signal that represents a voltage of the first DC output signal;

a third input to receive a third sense signal that represents a voltage of the second DC output signal; and an output circuit to provide the monitor signal in the first state when the second sense signal is below a second predetermined threshold and the third sense signal is below a third predetermined threshold.

5. The control circuit of claim 4, wherein the output circuit is configured to provide the monitor signal in the second state when the second sense signal is greater than or equal to the second predetermined threshold or the third sense signal is greater than or equal to the third predetermined threshold; and wherein the protection control circuit is configured to provide the switch control signal in the second state when the first sense signal is greater than or equal to the first predetermined threshold value or the monitor signal is in the second state.

6. The control circuit of claim 4, wherein the monitor circuit includes:

a first resistive divider circuit coupled between an output of the first DC to DC converter and a reference node to provide the second sense signal that represents the voltage of the first DC output signal; and a second resistive divider circuit coupled between an output of the second DC to DC converter and the reference node to provide the third sense signal that represents the voltage of the second DC output signal.

7. The control circuit of claim 4, wherein the monitor circuit includes:

a comparison circuit to compare the second sense signal to a reference signal that represents the second predetermined threshold, and to compare the third sense signal to another reference signal that represents the third predetermined threshold, the comparison circuit including an output to provide a driver output signal having a first state when the second sense signal is below the second predetermined threshold and the third sense signal is below the third predetermined threshold, and a different second state when the second sense signal is greater than or equal to the second predetermined threshold or the third sense signal is greater than or equal to the third predetermined threshold; and a transistor controlled by the driver output signal to provide the monitor signal in the first state when the driver output signal is in the first state, and to provide the monitor signal in the second state when the driver output signal is in the second state.

8. The control circuit of claim 2, wherein the monitor circuit is configured to:

provide the monitor signal in the first state when a second sense signal that represents a voltage of the first DC output signal is below a second predetermined threshold and a third sense signal that represents a voltage of the second DC output signal is below a third predetermined threshold; and provide the monitor signal in the second state when the second sense signal is greater than or equal to the second predetermined threshold or the third sense signal is greater than or equal to the third predetermined threshold.

9. The control circuit of claim 8, wherein the monitor circuit includes:

a comparison circuit to compare the second sense signal to a reference signal that represents the second predetermined threshold, and to compare the third sense signal to another reference signal that represents the third predetermined threshold, the comparison circuit including an output to provide a driver output signal having a first state when the second sense signal is below the second predetermined threshold and the third sense signal is below the third predetermined threshold, and a different second state when the second sense signal is greater than or equal to the second predetermined threshold or the third sense signal is greater than or equal to the third predetermined threshold; and a transistor controlled by the driver output signal to provide the monitor signal in the first state when the driver output signal is in the first state, and to provide the monitor signal in the second state when the driver output signal is in the second state.

10. The control circuit of claim 1, wherein the monitor circuit is configured to:

provide the monitor signal in the first state when a sense signal that represents a voltage of the first DC output signal is below a predetermined threshold and another sense signal that represents a voltage of the second DC output signal is below another predetermined threshold; and provide the monitor signal in the second state when the sense signal is greater than or equal to the predetermined threshold or the other sense signal is greater than or equal to the other predetermined threshold.

11. The control circuit of claim 10, wherein the monitor circuit includes:

a comparison circuit to compare the sense signal to a reference signal that represents the predetermined threshold, and to compare the other sense signal to another reference signal that represents the other predetermined threshold, the comparison circuit including an output to provide a driver output signal having a first state when the sense signal is below the predetermined threshold and the other sense signal is below the other predetermined threshold, and a different second state when the sense signal is greater than or equal to the predetermined threshold or the other sense signal is greater than or equal to the other predetermined threshold; and a transistor controlled by the driver output signal to provide the monitor signal in the first state when the driver output signal is in the first state, and to provide the monitor signal in the second state when the driver output signal is in the second state.

12. A safety system, comprising:
a protection circuit, configured to connect a DC input signal to first and second DC to DC converters in a first state when the DC input signal is below a first predetermined threshold and a monitor signal is in a first state, and to disconnect the DC input signal from the first and second DC to DC converters in a second state when the DC input signal is greater than or equal to the first predetermined threshold or the monitor signal is in a second state; and
a monitor circuit, including a monitor circuit output to provide the monitor signal in the first state when a first DC output signal of the first DC to DC converter is below a second predetermined threshold and a second DC output signal of the second DC to DC converter is below a third predetermined threshold, and to provide the monitor signal in the second state when the first DC output signal is greater than or equal to the second predetermined threshold or the second DC output signal is greater than or equal to the third predetermined threshold.

13. The safety system of claim 12, wherein the protection circuit includes:
a switch configured when a switch control signal is in a first state to connect the DC input signal to the first and second DC to DC converters, and configured when the switch control signal is in a different second state to disconnect the DC input signal from the first and second DC to DC converters; and
a protection control circuit, including a protection control circuit output to provide the switch control signal according to the DC input signal and the monitor signal.

14. The safety system of claim 13,
wherein the protection control circuit includes a first input to receive a first sense signal that represents a voltage of the DC input signal, and a second input coupled to receive the monitor signal from the monitor circuit; and
wherein the monitor circuit includes a second input to receive a second sense signal that represents a voltage of the first DC output signal, and a third input to receive a third sense signal that represents a voltage of the second DC output signal.

15. The safety system of claim 14, wherein the monitor circuit includes:
a comparison circuit to compare the second sense signal to a reference signal that represents the second predetermined threshold, and to compare the third sense signal to another reference signal that represents the third predetermined threshold, the comparison circuit including an output to provide a driver output signal having a first state when the second sense signal is below the second predetermined threshold and the third sense signal is below the third predetermined threshold, and a different second state when the second sense signal is greater than or equal to the second predetermined threshold or the third sense signal is greater than or equal to the third predetermined threshold; and
a transistor controlled by the driver output signal to provide the monitor signal in the first state when the driver output signal is in the first state, and to provide the monitor signal in the second state when the driver output signal is in the second state.

16. The safety system 12, wherein the protection control circuit includes a first input to receive a first sense signal that represents a voltage of the DC input signal, and a second input coupled to receive the monitor signal from the monitor circuit; and
wherein the monitor circuit includes a second input to receive a second sense signal that represents a voltage of the first DC output signal, and a third input to receive a third sense signal that represents a voltage of the second DC output signal.

17. The safety system of claim 16, wherein the monitor circuit includes:
a comparison circuit to compare the second sense signal to a reference signal that represents the second predetermined threshold, and to compare the third sense signal to another reference signal that represents the third predetermined threshold, the comparison circuit including an output to provide a driver output signal having a first state when the second sense signal is below the second predetermined threshold and the third sense signal is below the third predetermined threshold, and a different second state when the second sense signal is greater than or equal to the second predetermined threshold or the third sense signal is greater than or equal to the third predetermined threshold; and
a transistor controlled by the driver output signal to provide the monitor signal in the first state when the driver output signal is in the first state, and to provide the monitor signal in the second state when the driver output signal is in the second state.

18. An ISO 13849-1 Category 4 compliant power system, comprising:
a power source to provide a DC input signal limited to a predetermined maximum voltage after multiple faults;
a first DC to DC converter to convert the DC input signal to provide a first DC output signal;
a second DC to DC converter to convert the DC input signal to provide a second DC output signal;
a protection circuit, configured to connect the DC input signal to the first and second DC to DC converters in a first state when the DC input signal is below a first predetermined threshold and a monitor signal is in a first state, and to disconnect the DC input signal from the first and second DC to DC converters in a second state when the DC input signal is greater than or equal to the first predetermined threshold or the monitor signal is in a second state; and
a monitor circuit, including a monitor circuit output to provide the monitor signal in the first state when a first DC output signal of the first DC to DC converter is below a second predetermined threshold and a second DC output signal of the second DC to DC converter is below a third predetermined threshold, and to provide the monitor signal in the second state when the first DC output signal is greater than or equal to the second predetermined threshold or the second DC output signal is greater than or equal to the third predetermined threshold.

19. The power system of claim 18, wherein the protection circuit includes:
a switch configured when a switch control signal is in a first state to connect the DC input signal to the first and second DC to DC converters, and configured when the switch control signal is in a different second state to disconnect the DC input signal from the first and second DC to DC converters; and a protection control circuit, including a protection control circuit output to provide the switch control signal according to the DC input signal and the monitor signal.

20. The power system of claim 18, wherein the protection control circuit includes a first input to receive a first sense signal that represents a voltage of the DC input signal, and a second input coupled to receive the monitor signal from the monitor circuit; and wherein the monitor circuit includes a second input to receive a second sense signal that represents a voltage of the first DC output signal, and a third input to receive a third sense signal that represents a voltage of the second DC output signal.

\* \* \* \* \*